US006971062B1

(12) United States Patent
Tolpin

(10) Patent No.: US 6,971,062 B1
(45) Date of Patent: Nov. 29, 2005

(54) METHODS FOR RENDERING FOOTNOTES

(75) Inventor: David Tolpin, Yerevan (AM)

(73) Assignee: RenderX, Palo Alto, CA (US)

( * ) Notice: Subject to any disclaimer, the term of this patent is extended or adjusted under 35 U.S.C. 154(b) by 618 days.

(21) Appl. No.: 09/699,530

(22) Filed: Oct. 30, 2000

Related U.S. Application Data

(60) Provisional application No. 60/203,809, filed on May 19, 2000.

(51) Int. Cl.⁷ ............................................. G06F 15/00
(52) U.S. Cl. ...................... 715/537; 715/503; 715/512; 715/517
(58) Field of Search ................................ 715/537, 512, 715/503, 530, 522, 517; 345/502

(56) References Cited

U.S. PATENT DOCUMENTS

| | | | | |
|---|---|---|---|---|
| 4,503,515 A | * | 3/1985 | Cuan et al. .................. | 715/537 |
| 4,648,067 A | * | 3/1987 | Repass et al. ............... | 715/537 |
| 5,097,418 A | * | 3/1992 | Nurse et al. ................. | 715/537 |
| 5,111,397 A | * | 5/1992 | Chirokas et al. ............ | 715/537 |
| 5,113,494 A | * | 5/1992 | Menendez et al. .......... | 345/502 |
| 5,323,312 A | | 6/1994 | Saito et al. | |
| 5,420,695 A | | 5/1995 | Ohta .......................... | 358/462 |
| 5,438,512 A | | 8/1995 | Mantha et al. | |
| 5,450,536 A | | 9/1995 | Rosenberg et al. ......... | 395/148 |
| 5,475,805 A | | 12/1995 | Murata et al. | |
| 5,495,561 A | | 2/1996 | Holt ............................ | 395/114 |
| 5,553,217 A | | 9/1996 | Hart et al. | |
| 5,600,771 A | | 2/1997 | Hayashi et al. | |
| 5,633,996 A | | 5/1997 | Hayashi et al. | |
| 5,845,299 A | | 12/1998 | Arora et al. ................. | 715/513 |
| 5,860,073 A | * | 1/1999 | Ferrel et al. ................ | 715/522 |
| 5,870,770 A | | 2/1999 | Wolfe ......................... | 345/805 |
| 5,883,635 A | | 3/1999 | Rao et al. .................... | 345/440 |
| 5,893,127 A | | 4/1999 | Tyan et al. .................. | 715/513 |
| 5,895,477 A | | 4/1999 | Orr et al. ..................... | 707/517 |
| 5,900,002 A | * | 5/1999 | Bottomly .................... | 715/517 |
| 6,012,098 A | | 1/2000 | Bayeh et al. | |
| 6,031,989 A | | 2/2000 | Cordell | |
| 6,088,708 A | | 7/2000 | Burch et al. ................ | 715/509 |
| 6,230,170 B1 | * | 5/2001 | Zellweger et al. .......... | 715/512 |

(Continued)

FOREIGN PATENT DOCUMENTS

| | | | | |
|---|---|---|---|---|
| EP | 0094546 | 11/1983 | ........... | G06F 15/20 |
| EP | 0398477 | 11/1990 | ........... | G06F 15/20 |

OTHER PUBLICATIONS http://v8doc.sas.com/sashtml/gref/z0724351.htm Title, Footnote, and Note Statements pp. 1-2 and 1-19 Copyright 1999 by SAS Institute Inc, USA.*

*Primary Examiner*—William Bashore
*Assistant Examiner*—Quoc A. Tran
(74) *Attorney, Agent, or Firm*—Schwegman, Lundberg, Woessner & Kluth, P.A.

(57) ABSTRACT

Methods are provided for rendering footnotes to a variety of media. Footnote citations and non footnote data are received and inserted into a unit of media at a beginning location within the unit of media. If a footnote citation is detected, insertion into the unit of media is interrupted and the area associated with receiving the non footnote data and the footnote citation is inverted within the unit of media such that the footnote bodies are received and inserted into the unit of media at the beginning location. After insertion of the footnote bodies is complete, the area associated with receiving the non footnote data and the footnotes citation is restored such that the non footnote data and the footnote citations are located at the beginning location within the unit of media.

20 Claims, 5 Drawing Sheets

U.S. PATENT DOCUMENTS

| | | | |
|---|---|---|---|
| 6,292,809 B1 | 9/2001 | Edelman | 715/503 |
| 6,415,305 B1 | 7/2002 | Agrawal et al. | 715/503 |
| 6,613,099 B2 | 9/2003 | Crim | 715/523 |
| 6,661,919 B2 | 12/2003 | Nicholson et al. | 382/173 |
| 6,694,487 B1 | 2/2004 | Ilsar | 715/527 |
| 2002/0069221 A1 | 6/2002 | Rao et al. | 715/509 |

* cited by examiner

| | STATE | US | UE | TS | TE | TA | FS | FE |
|---|---|---|---|---|---|---|---|---|
| | INITIAL | 0 | 94 | 0 | 28 | 66 | -1 | -1 |
| 450 | 26 TO FOOTNOTE BODY | 0 | 94 | 94 | 66 | 40 | 0 | 25 |
| 460 | 40 TO TEXT | 0 | 94 | 0 | 67 | 0 | 94 | 68 |
| | RENDER UNIT | 0 | 94 | 0 | 67 | 0 | 68 | 94 |

FIG. 5

METHODS FOR RENDERING FOOTNOTES

This application claims priority from U.S. Provisional 60/203,809 filed May 19, 2000, the disclosure of which is incorporated herein by reference.

FIELD OF THE INVENTION

The present invention relates to methods for rendering footnotes into a variety of media.

BACKGROUND OF THE INVENTION

The delivery of information has become omnipresent in recent years with the advent of the Internet and the World-Wide Web (WWW). Moreover, browsers and viewers, which permit the information to be displayed, are now standard with any computing device acquired by a consumer today. By way of example only, some of the WWW browsers include Netscape, Internet Explorer, and others. Often these browsers are equipped with external viewer plugins, which facilitate viewing data in a variety of formats. Information used within a browser is often referred to as browser media. Other types of media, such as paged media exist as well.

Information viewed in a browser is optimally formatted or rendered to be displayed and traversed within the browser (e.g. within the browser media environment). Yet, that same data is not optimally viewed when it is transferred to a paged media. For example, footnote data viewed in a WWW browser may include a hypertext link associated with a footnote citation, and when this link is activated the footnote body associated with the footnote citation becomes viewable, either in a separate popup window, or within the same browser window. Although this is optimal and efficient for browser media, it is not feasible when the footnote data is transferred to print media, since any link would have to be manually traversed within the printed document by the user. In fact, often when footnote bodies are printed from a browser media, all of the footnotes occur at the end of the document, rather than at the end of each page wherein a corresponding footnote citation matching a footnote body occurs.

This is cumbersome, especially if a user only desires to view a few pages of a publication in printed form. Furthermore, users typically desire, when reading a printed page, having the start of a footnote body present on the same page in which the corresponding footnote citation occurs. It is more efficient for the user, when referring to the footnote body on a printed page, to have the footnote citation occur within the text of the same page as its concomitant footnote body.

Furthermore, the problem of transferring data from a browser or a viewer to a printer is not uncommon and is not limited to footnote data. In fact, anyone who has selected what appeared to be well formatted information for printing in a WWW browser, is often astonished to discover that once the information is outputted to a paged media from the printer, the information is no longer suitable for viewing. Users may be forced to change the page setup within the printer, select landscape modes, and a variety of other choices in an attempt to get a paged media version of what they are currently viewing in a browser media on their computing device s monitor. But, even these options will not merge footnote bodies with footnote citations properly within paged media.

Reconciling browser media and page media is problematic, particularly when attempting to render footnote data from a browser media to a paged media. Footnote bodies may be physically kept separate from the text within which the corresponding footnote citations occur. As a result, even changing the options associated with a printer will do little to resolve the problem of merging footnote bodies with the appropriate footnote citations when printing footnote data.

To solve this, and many other problems associated with data presentation, an industry wide consortium developed a series of data format standards designed to assist in the transition of data being displayed in different media. One primary standard is Extensible Markup Language (XML), which displays data in terms of its content devoid of any presentation attributes.

Raw XML is not particularly useful in the displaying or the presentation of data in a browser or a paged media by itself, rather, the XML is useful in divorcing the proprietary presentation associated with each media from the data markup, thereby requiring each media to render the raw XML into a useful format prior to displaying it to a user. A number of rendering languages and standards have emerged to assist in this effort, such as by way of example only Extensible Stylesheets Language (XSL), Extensible Stylesheets Language Transformations (XSLT), Cascading Style Sheets (CSS) and others. These rendering languages provide guidelines and utilities to take raw XML and render it to a useful presentation format for a particular media.

Yet, even with the design consistency associated with a standard data format (e.g. XML) and a variety of additional rendering utilities and guidelines (e.g. XSL, XSLT, CSS), footnote data still presents a number of difficult problems when attempting to transfer the footnote data from a browser media to a paged media, since the footnote citations may be stored separately from the footnote bodies within the data being rendered, and since a single page must have at least the beginning of a footnote body on the same page in which the corresponding footnote citation occurs.

Moreover, present techniques to render footnote bodies on the same page wherein a footnote citation occurs, include inefficient techniques which require continuous iterations of computations to adjust the areas on a page associated with non footnote data and footnote bodies. In prior techniques, as footnote bodies are added to the same page previously placed footnote citations drift to the top of the page, requiring complex iterative recalculations of the positions of the footnote citations and the footnote bodies within the page. This is necessary to avoid the possibility that a previously placed footnote citation which has a corresponding footnote body already rendered on a page, will not drift to a previous page as the footnote body data increases on the page. Accordingly, more efficient techniques for rendering footnotes are needed.

SUMMARY OF THE INVENTION

Accordingly, an object of the invention is to provide methods for rendering footnotes to an output media regardless of the complex data layouts required. Moreover, the footnote rendering may be performed in stream as opposed to in batch mode resulting in improved performance and efficiency. This permits users to truly realize the benefits of seamlessly transitioning between multiple media environments without a loss in presentation or performance during the transition.

To accomplish this and other aspects of the present invention, footnote data are recognized and parsed from an initial source media. An output media whereto the footnotes are to be rendered is associated with a unit of the media having definable dimensions. Data, which are not footnote bodies, are populated into the unit of media in a resizable area, beginning at the start of the unit of media. When a footnote citation is encountered, the data, which are not footnote bodies, are inverted on the unit of media and the footnote body data associated with the footnote citation are inserted into the unit of media at the start of the unit of media. Upon completion of the footnote body, the footnote body is inverted, and the data, which are not the footnote body, are restored to their original location within the unit of media. When the unit of media becomes fully populated, the footnote bodies are adjusted so the bodies occur in the proper sequence within the unit of media.

In this way, it will become apparent to those skilled in the art, that should a unit of media become fully populated during insertion of a footnote body, any remaining data associated with the footnote body may be easily migrated to the next unit of media. Moreover, by inverting the unit of media, iterative recalculations become unnecessary. Further, inversion may be achieved, by way of example only, with simple pointers to locations within the unit of media associated with resizable insertion areas, such that performance of rendering footnotes is greatly improved over existing techniques.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods are provided for rendering footnotes.

A set of executable instructions for inserting footnotes into a media is provided, comprising receiving non footnote body data and footnote body data, wherein the non footnote body data are inserted into one or more first locations within a media. Moreover, the non footnote body data are inverted to one or more second locations when the footnote body data are inserted into the media. Further, the non footnote body data are restored into the first locations with the footnote body data occupying at least one or more of the second locations.

Moreover, a set of executable instructions operable to render footnotes is provided, comprising receiving data including non footnote data and footnote data having footnote citations and footnote bodies. The non footnote data and the footnote citations are serially inserted into a media. However, insertion is interrupted when footnote citations are encountered, and a start location and an end location associated with a unit of the media are inverted such that the end location houses the non footnote data and the footnote citations while the footnote bodies are inserted serially at a start location within the unit of media. After the footnote bodies are inserted into the media, the start and end locations are swapped such that the non footnote data and the footnote citations are located at the start location and the footnote bodies are located at the end location.

Finally, a set of executable instructions operable to manage the rendering of footnotes is provided wherein an entry path for receiving footnote body data is associated with a unit of media. Moreover, a second path for receiving non footnote body data is associated with the unit of media. Further, a first location associated with the second path is reversed with an ending location associated with the entry path for purposes of inserting the footnote body data into the unit of media.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings incorporated in and forming part of the specification, illustrate several aspects of the present invention and, together with their descriptions, serve to explain the principles of the invention. In the drawings:

FIG. 5 depicts a schematic state transition table associated with FIGS. 4a–4d.

DETAILED DESCRIPTION

The present invention provides methods for rendering footnotes. One embodiment of the present invention is implemented using web browser technologies including well-known software programming languages (e.g., C, C++, Java, Active X, Active Server Pages, XSLT, Xpath) and Internet communication protocols (TCP/IP). Of course other programming languages and communications protocols (now known or hereafter developed) may be also readily employed.

As previously presented, rendering footnotes to a unit of media such as, by way of example only, a printed page from a different originating media such as, by way of example only, browser media is problematic. This is so because as more footnote body data are added to a unit of media, previously inserted footnote citations are forced upward on the unit of media and continuous calculations are needed to determine if the footnote body data may be properly inserted. As one skilled in the art will appreciate, these computations effect performance of rendering the footnotes to the unit of media and one desiring to produce any substantial number of units having footnotes will readily notice the performance degradation.

The present invention resolves problems associated with the continuous recalculation of the input areas used for housing footnote data by inverting the unit of media one or more times as data are serially inserted into the media. For example, consider, by way of example only, a unit of media such as a printed page to which data such as, by way of example only, text data is to be rendered. The text data are initially received in a XML or XSL format, although as one skilled in the art will appreciate any input format could provide the initial text data both standard and ad hoc. The text data is parsed and from the initial provided format, and inserted onto the printed page.

Although, as one skilled in the art will readily appreciate, the data need not be directly printed to the printed page, rather, the data may be translated to printer formatting commands such that when the commands are executed the data is physically impregnated on the printed page. A variety of commands to direct the printer to produce a printed page may be used and are well known in the art, such as by way of example only, PDF and PCL. By way of example only, consider FIG. 4a, which depicts an initial condition of page 330, which is to receive text 370. The page 330 is logically represented within a set of rendering executable instructions as a series of areas with an ordered sequence. Moreover, the page 330 represents a unit of the output media and has a dimension associated therewith. In the present example, the page 330 is a standard 8½×11-inch page, although any dimension and media may be used with the present invention.

Figure 4A:
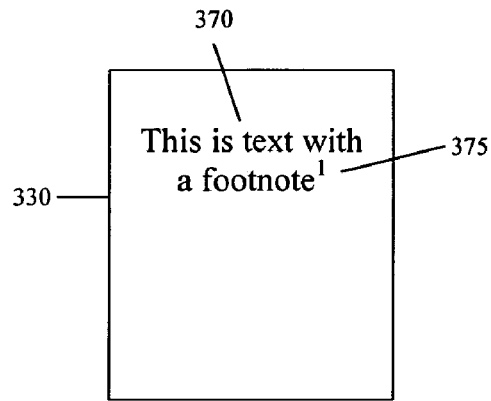
FIG. 4a depicts a block diagram of an initial unit of media with no footnote body data.
Figure 4B:
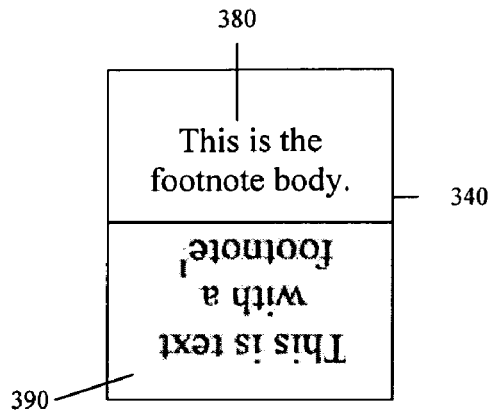
FIG. 4b depicts a block diagram of a unit of media receiving an initial footnote body data.

In FIG. 4a, the text 370 is received in the page 330 until a footnote citation 375 is detected while parsing the text 370 from the initial provided input format and media. The footnote citation 375 is inserted into the page 330 and control is briefly interrupted such that the ordered sequence associated with the page 330 is altered and inverted as depicted in FIG. 4b, which depicts a page 340 receiving footnote body data 380 having the initial text 390 inverted within the page 340.

Figure 4C:
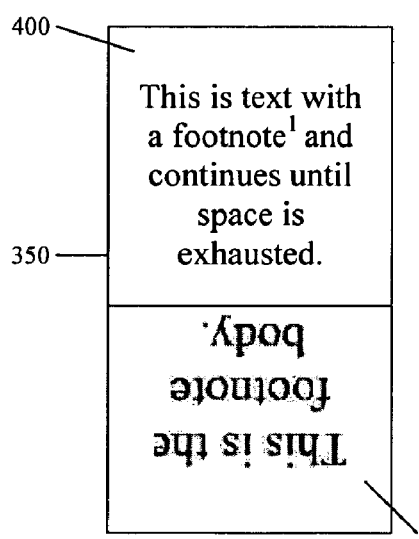
FIG. 4c depicts a block diagram of a unit of media receiving non footnote body data.

Upon completion of receiving the footnote body data 380, a page 350 in FIG. 4c receives additional text data 400 which is not footnote body data. Prior to receiving the additional text data 400, the page 350 is again inverted such that the ordered sequence is again altered and the footnote body data 410 are inverted within the page 350. This process continues until a page 360 of FIG. 4d becomes completely full (e.g. all space associated with the dimension of the page is occupied). Once page 360 is fully occupied, the footnote body data 430 may be reordered, so that it may be read in the proper sequence within the page 360.

As one skilled in the art will appreciate, the above described example may be achieved by using a set of executable instructions in a variety of ways, such as by way of example, using pointers to locations within a data structure that logically represents the output unit of media (e.g. page). In fact, input areas within the page may be represented as a series of geometric rectangles which are continually resizing themselves at any particular moment as data is inserted into the page. The text data not associated with footnote body data and the footnote citation data may occupy one such rectangle and the footnote body data may occupy another rectangle. Moreover, multiple rectangles may be linked together within the unit of media to form a path of insertion, such that data are inserted into the path, which is nothing more than a linked list of the rectangular areas, the head of the list defining the initial insertion point of the data into the media. Furthermore, different types of media may have their own paths such that a single unit of media may have multiple paths with each path housing disparate media, such as audio, video, table, image data and others.

By way of example only, consider FIG. 5, which depicts a state transition of FIGS. 4a–4d, in this example a single page may be represented as a series of ordered locations beginning with a start location of 0 and continuing with an ending location of 94. Although not depicted in FIGS. 4a–4d or FIG. 5, as one skilled in the art will appreciate, the locations may be further represented to define a height and width associated with each location 0–94, and these locations may be logically linked together to represent geometric rectangles and paths as discussed above.

FIG. 5 depicts columns and rows, which assist in explaining the transitions of FIGS. 4a–4d. The US 490 column depicts the starting location for a unit of media (e.g. page in the present example) which is a constant throughout the transitions, namely 0. The UE 500 column depicts the ending location for the unit of media. The TS 510 column depicts the starting location for the non footnote body data within the unit of media, and the TE 520 column depicts the ending location for the non footnote body data within the unit of media. The TA 530 column depicts the available space for non footnote body data to occupy, this is provided for purposes of illustration only, as one skilled in the art will readily appreciate this is not necessary. The FS 540 column depicts the location where footnote body data begins within the unit of media, and the FE 550 column depicts the ending location of the footnote body data within the unit of media.

The initial state 440 corresponds to FIG. 4a, where 29 characters of text data 370 are being inserted into page 370, serially beginning at the initial location associated with the page (e.g. location 0). The insertion continues until the text occupies page locations 0–28 for a total of 29 locations, available text locations are 66, and since no footnote body data yet exists these locations are represented by 1 in FIG. 5 under the columns FS 540 and FE 550.

After a footnote citation 375 is detected in FIG. 4a, the representation of the page 330 transitions to state 450 of FIG. 5, where the text 390 of FIG. 4b is now inverted logically within the page 340, such that the start location of the text 390 TS 510 is in the 94$^{th}$ location of the page 340. In FIG. 4b 26 characters of text 380 are being added to the area on the page 340 associated with the footnote body 380. Prior to this insertion the page 340 is inverted so that the start location for the footnote body data FS 540 is identified as the initial location within the page 340 or 0 and continues to location 25 (e.g. 26 characters in length). Moreover, the space available for data insertion on the page TA 530 is reduced from 66 to 40 after the insertion of 26 characters of footnote body data 380. Further, the inversion of the non footnote body data 390 creates a reverse order of that data such that the ending location TE 520 within the page for the non footnote body data is location 66 while the start location TS 510 is location 94.

Once all the footnote body data 380 is received within the page 340 in FIG. 4b and additional text data, the logical representation of the page 340 is altered as depicted in state transition 460 of FIG. 5 to generate the page 350 depicted in FIG. 4c. In state transition 460, 40 additional characters of non footnote body data 400 are inserted into the page 350. The page 350 is again inverted prior to this insertion, such that the start location of the non footnote body data 400 TS 510 becomes the start location of the page 350 again or the 0 location. The ending position of the non footnote body data 400 TE 520 becomes 67 (e.g. length is 68 characters of non footnote body data 400). Further, the area available TA 530 on page 350 is now 0, since 68 characters of non footnote body data 400 plus 26 characters of footnote body data 410 equals 95 characters which is the entire area of the page 350. Moreover, the footnote body data 410 is inverted and reversed on the page 350, such that the footnote body s 410 start location FS 540 is 94 and the footnote body 410 end location is 68.

Figure 4D:
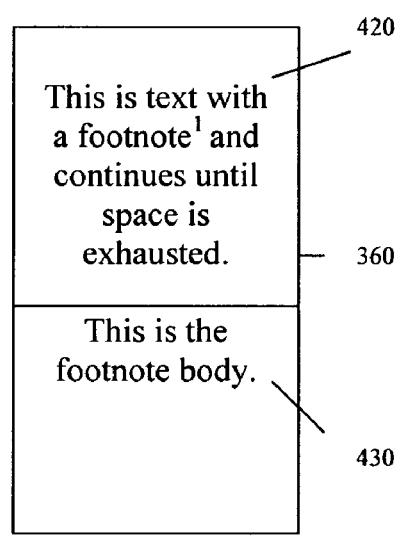
FIG. 4d depicts a block diagram of a unit of media fully populated.

Once it is determined that page 350 is fully populated FIG. 4c transitions to FIG. 4d as depicted in state transition 470 of FIG. 5. During this transition all that is needed is to reverse the order of the footnote body 410 of FIG. 4c to the footnote body 430 order of FIG. 4d, indicating that the footnote body 430 has a start location FS 540 within page 360 of 68 and an ending location FE 550 of 94. After transitioning to FIG. 4d, the entire page may be rendered and formatted as desired and delivered to the desired unit of media.

As one skilled in the art will appreciate, the above transitions, presented for purposes of illustration only, may be implemented in a variety of ways and a state table is not required. In fact, pointers to locations within a representation of a unit of media along with the appropriate state transition flags are all that is needed to implement the present invention. In a given circumstance a pointer implementation may greatly improve the performance associated with rendering footnotes in this manner by avoiding accesses to tables during execution. Although, it is readily apparent to one skilled in the art, without departing from the present invention, that any number of implementation mechanisms may be deployed.

Figure 1:
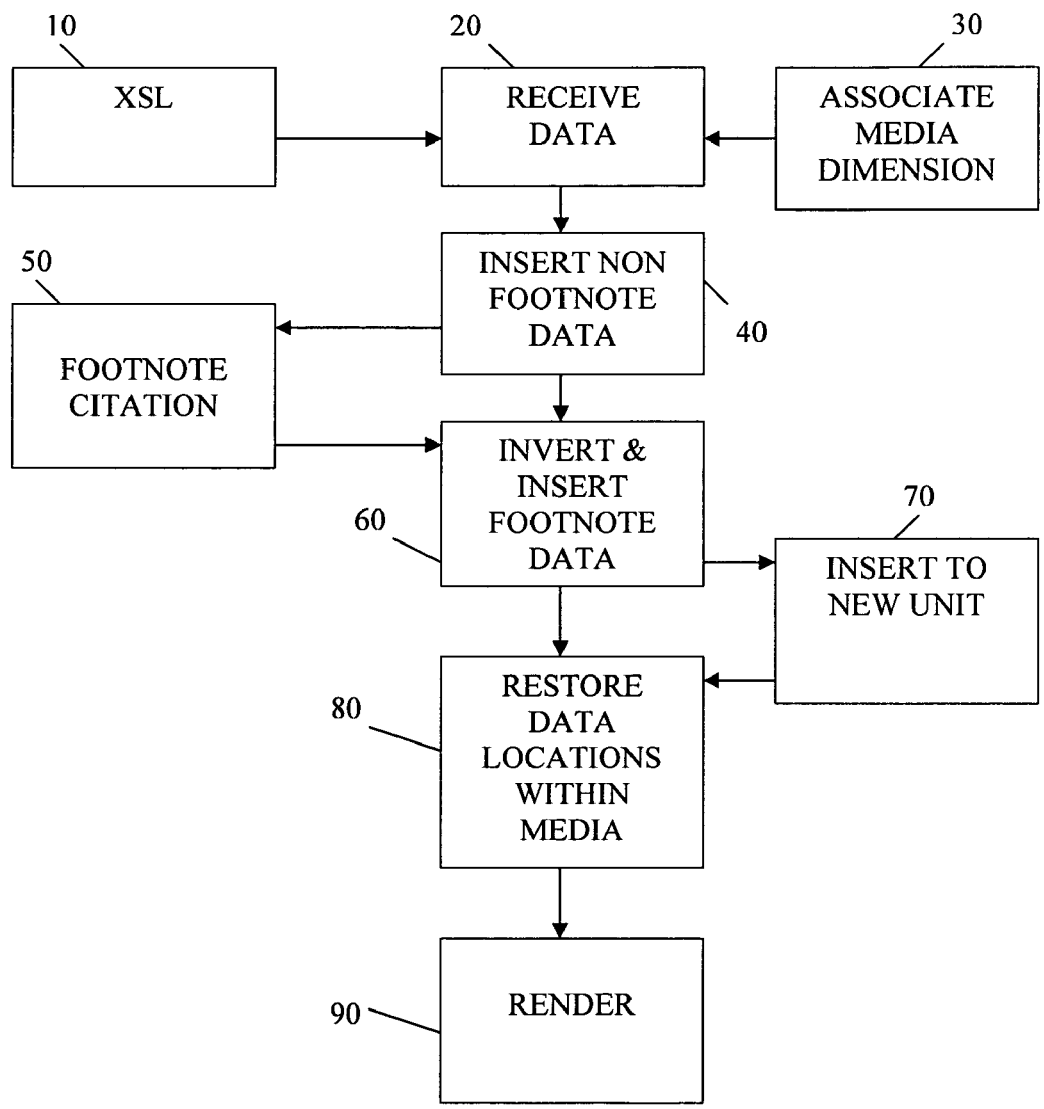
FIG. 1 depicts a flow diagram of a method of inserting footnotes to a media.

FIG. 1 depicts a flow diagram of a method for inserting footnotes to a media. Data is initially received in step 20 and associated with a unit of media dimension in step 30 to which the data is to be rendered. Further, the data received in step 20 may be received in XSL format in step 10. The received data is then parsed a variety of parsing tools exist, such as by way of example only Flex, Lex, Yacc, Perl, and others. For purposes of illustration only, three types of data are recognized during the parsing of the received data, these types include non footnote body data, footnote citations, and footnote body data. A logical representation of the unit of media is created and in step 40 the non footnote body data is inserted into that logical representation.

When a footnote citation is parsed and recognized in step 50, it is inserted into the logical representation of the unit of media and this detection further triggers a logical reordering of the media representation creating an inverted view of the representation and the footnote body data is then inserted into this revised representation in step 60. An example of how this may occur, was previously presented. If the footnote body data exceeds the dimensions associated with a single unit of the media, the data is transferred to a new subsequent unit of media in step 70.

After, the footnote body data is inserted and space available on the unit of media exhausted, the logical representation of the unit of media is restored in step 80 to its original condition, and it is formatted as desired and rendered in step 90 to the desired media.

As one skilled in the art will readily appreciate, the method depicted by FIG. 1 may occur iteratively with the logical representation of the unit of media being adjusted and inverted one or more times until a unit of media becomes fully populated or the data received completely exhausted. Moreover, as previously discussed, the output of the method may be formatting commands which are operable to be executed to complete the delivering of the unit of media to its appropriate media (e.g. PCL command which when executed produce a printed page).

Figure 2:
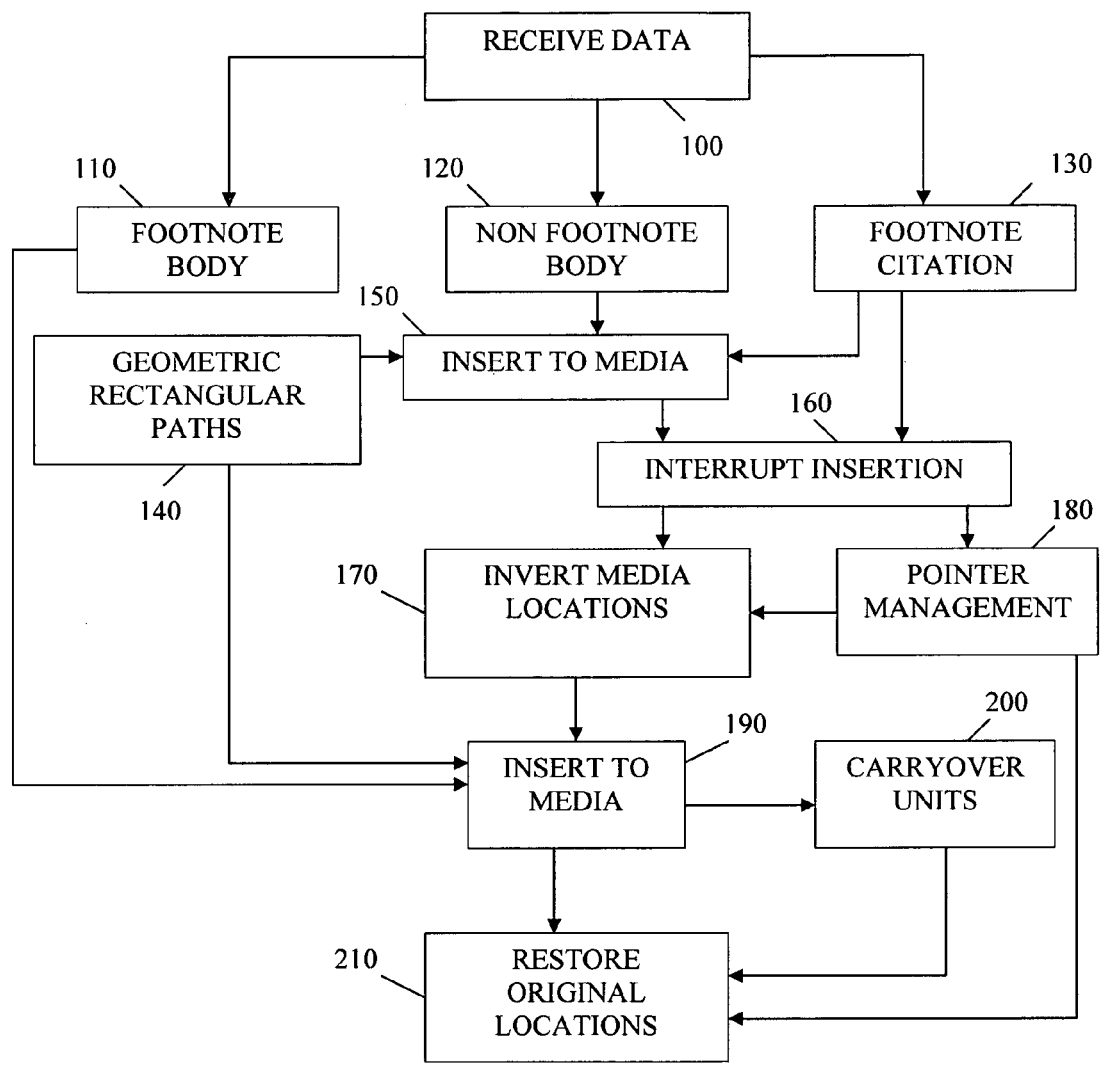
FIG. 2 depicts a flow diagram of a method of rendering footnote data.

FIG. 2 depicts a flow diagram of a method of rendering footnote data. Initially data are received in step 100 and separated in to at least three types of data including footnote body data in step 110, non footnote body data in step 120 and footnote citation data in step 130. Next, the non footnote body data are inserted into a unit of media in step 150. By way of example only, this unit of media may be a logical representation of a single page or logical representation of a sub part of a single page, such as a column within the page. Different areas within the unit of media may be defined by rectangular units linked together to form paths within the unit of media in step 140.

When a footnote citation data are detected in step 130, the footnote citation data are inserted into the unit of media (not shown) and an interruption in the insertion process occurs in step 160. The footnote body data detected in step 110 is retrieved and the unit of media locations inverted in step 170. The footnote body data are then inserted into the unit of media in step 190 with any carry over footnote body data pushed to a new unit of media in step 200 if the existing unit of media becomes fully populated.

Logical representations of the unit of media may be managed by pointers in step 180, and as described above. In this way, data is continuously inserted into the logical representation of the unit of media with minimal interruption and little need for expense calculations to ensure proper insertion. Moreover, complex insertions may be performed such that single columns of text within a unit of media may be treated as sub units and footnotes rendered as described herein.

After the data received are exhausted, the unit of media is restored to its ordered logical representation with the unit of media data in their proper locations in step 210. In this way, data is populated to the unit of media more efficiently, and with increased rendering performance.

Figure 3:
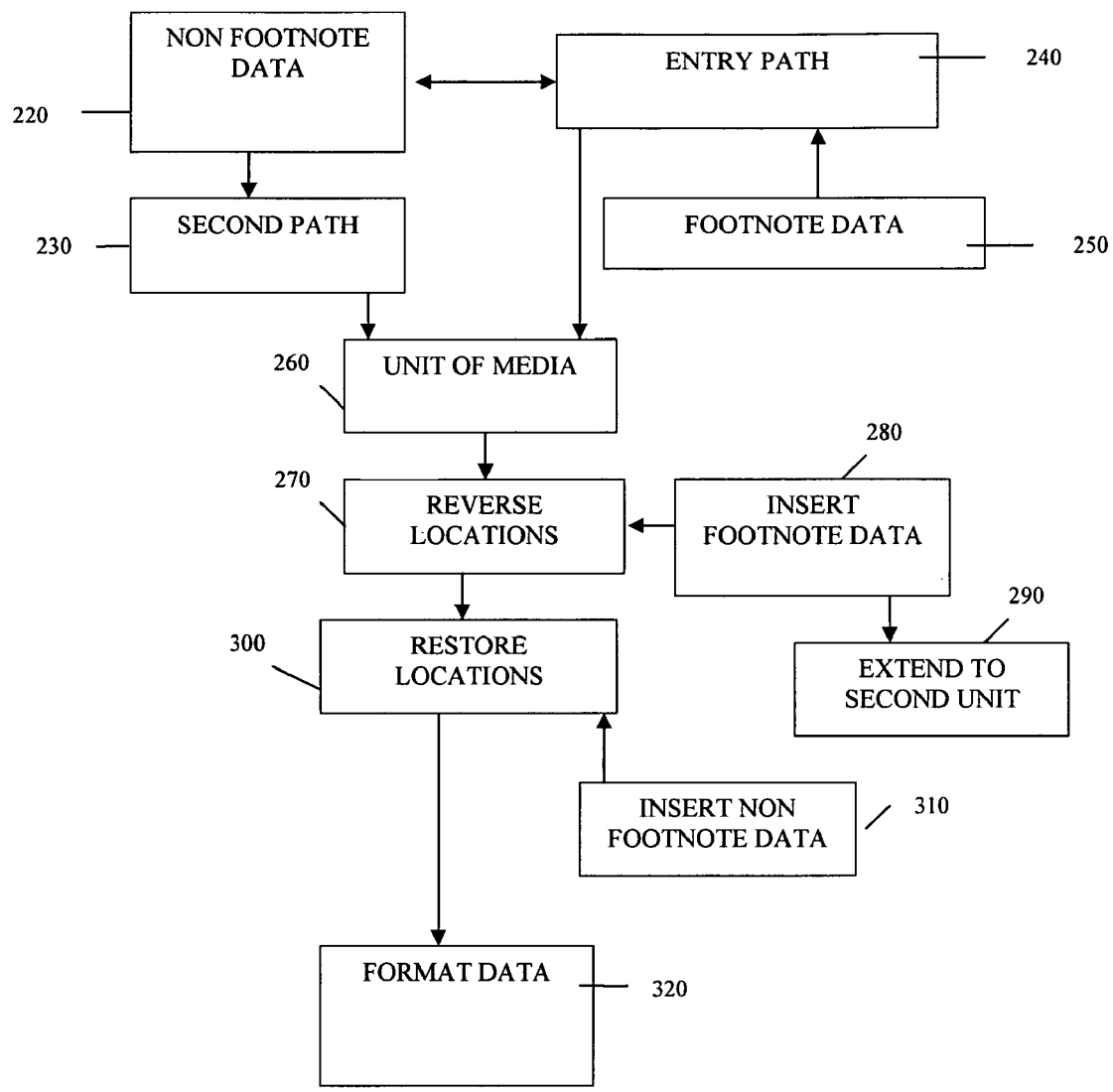
FIG. 3 depicts a flow diagram of a method of managing footnotes rendered to a media.

FIG. 3 depicts a flow diagram of a method of managing footnotes rendered to a media. Non footnote data is acquired in step 220 and its entry is associated with a second path in step 230, the path defining an area within a unit of media to accept the non footnote data in step 260. As previously presented, the unit of media is logical represented within a set of executable instructions as an area, such as by way of example only a page, or a portion of a page, such as areas within a page associated with columns or tables and having footnote data.

Moreover, footnote body data is acquired in step 250 and associated with an entry path in step 240 which is used to insert the footnote body data into the unit of media in step 260. In step 270, ordered locations within the representation of the unit of media are reversed for purposes of inserting the footnote body data in step 280. In step 290, if the footnote body data exceeds the capacity of the dimensions associated with the unit of media, the footnote body data are extended to a second unit of media.

When non footnote body data are inserted into the unit of media in step 310, the original locations are restored within the unit of media in step 300. After the unit of media is fully populated or the non footnote body data and footnote body data exhausted, the data is formatted in step 320 for final preparations and rendering to the appropriate physical media.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching.

For example, although XML and XSL were used as the primary initial data formats before footnotes are rendered, any data format, which is definable, could be used. Moreover, although the primary examples discuss rendering footnotes to a printer or paged media, footnotes may be rendered to application (e.g. fax, additional software modules, intelligent appliances, word processors, viewers, web television, television, and the like). Further, although a unit of media was discussed in terms of a printed page, footnotes may be rendered to sub units within a printed pages, such as by way of example only individual columns within a page having multiple columns. Accordingly, this invention is intended to embrace all alternatives, modifications, and variations that fall within the spirit and broad scope of the attached claims.

What is claimed is:

1. A method of processing footnotes implemented in a computer-readable medium, comprising:
   receiving non footnote body data and footnote body data;
   inserting the non footnote body data into a first location within a media;
   inverting the non footnote body data to a second location when the footnote body data are inserted into the media, wherein the footnote body data temporarily occupies portions of the first location, and wherein the first location represents a top portion of the media and the second location represents a bottom portion of the media; and
   restoring the non footnote body data into the first location with the footnote body data occupying the second location.

2. The method of claim 1, further comprising:
   associating a dimension with a logical unit of the media.

3. The method of claim 2, wherein the first location occurs sequentially before the second location within the media.

4. The method of claim 2, wherein the logical unit is an output page.

5. The method of claim 4, further comprising:
   continuing to insert the footnote body data to a second output page when the output page is populated and the footnote body data are not completely inserted into the media.

6. The method of claim 1, further comprising:
   receiving a citation data associated with the non footnote body data prior to inserting the footnote body data.

7. The method of claim 1, wherein the non footnote body data and the footnote body data are received in an extensible stylesheets language format.

8. The method of claim 7, further comprising rendering the non footnote body data and the footnote body data to an alternative format prior to insertion within the media.

9. A method of processing footnotes implemented in a computer-readable medium, comprising:
   receiving data including non footnote data and footnote data having one or more footnote citations and one or more footnote bodies;
   inserting the non footnote data and at least one footnote citation serially into a media;
   interrupting the insertion when at least one footnote citation is detected and inverting a start location and an end location associated with a unit of the media, wherein the start location represents a top portion of the unit of media and the end location represents a bottom portion of the unit of media, such that the end location houses the non footnote data and at least one of the footnote citations while at least one of the footnote bodies are inserted serially at a start location within the media, wherein the inverting temporarily moves the non footnote data to the end location of the unit of media and permits at least one of the footnote bodies to be inserted to the start location of the unit of media, which was previously occupied by portions of the non footnote data; and
   swapping the start location and the end location after inserting at least one of the footnote bodies such that the non footnote data and at least one of the footnote citations are located at the start location and at least one of the footnote bodies are located at the end location.

10. The method of claim 9, wherein the unit of the media is associated with a dimension.

11. The method of claim 9, wherein the unit of the media is a page.

12. The method of claim 9, wherein the non footnote data includes at least one of text data, image data, audio data, and video data.

13. The method of claim 9, further comprising:
    managing the start and end locations within the unit of media using one or more pointers.

14. The method of claim 9, further comprising:
    inserting a remaining portion of at least one of the footnote bodies to a subsequent unit of the media when a space associated with the unit of media becomes fully occupied during the insertion of at least one of the footnote bodies.

15. The method of claim 9, further comprising:
    associating dynamically resizable geometric areas within the unit of the media to house the footnote data and the non footnote data.

16. The method of claim 15, wherein the geometric areas are rectangles and the non footnote data and at least one of the footnote citations occupy a same geometric area.

17. A method of processing footnotes implemented in a computer-readable medium, comprising:
    associating an entry path for receiving footnote data with a unit of media;
    associating a second path for receiving non footnote body data with the unit of media; and
    inverting a first location on the unit of media associated with the second path with an ending location associated with the entry path for purposes of inserting the footnote data into the unit of media, and wherein the first location represents a top portion of the unit of media and the ending location represents a bottom portion of the unit of media.

18. The method of claim 17, further comprising:
    restoring the first location associated with the second path and the ending location associated with the entry path for purposes of inserting the non footnote data body into the unit of media.

19. The method of claim 18, further comprising:
    extending the entry path to a subsequent unit of media when the unit of media is full and insertion of all of the footnote data is not complete.

20. The method of claim 18, further comprising:
    formatting the footnote data and the non footnote body data within the unit of media after insertion.

* * * * *